March 28, 1933.          C. L. ROBERTS          1,903,267
AUTOMOBILE SEAT
Filed May 4, 1931
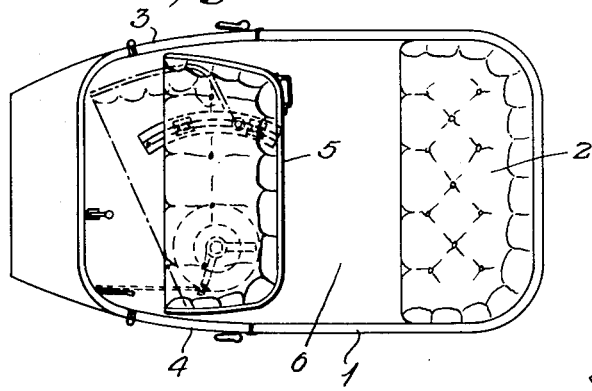
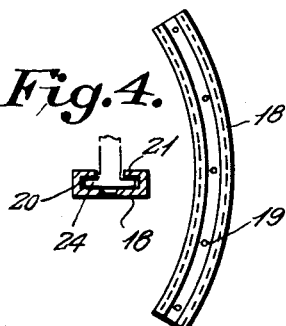
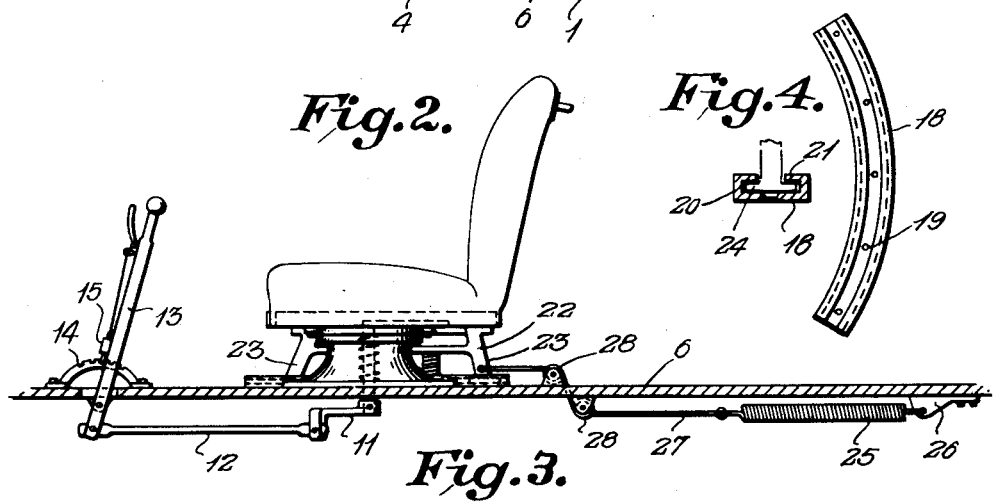
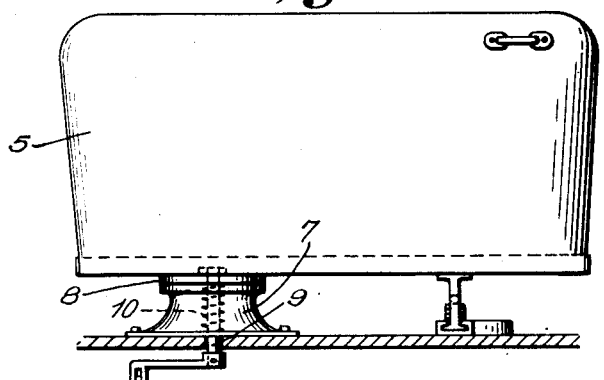
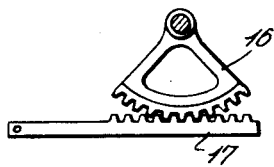
Inventor:
Clark L. Roberts,
By Ralph T. Barrett Atty.

Patented Mar. 28, 1933

1,903,267

UNITED STATES PATENT OFFICE

CLARK L. ROBERTS, OF NAMPA, IDAHO

AUTOMOBILE SEAT

Application filed May 4, 1931. Serial No. 534,927.

This invention relates to improvements in automobile seats of that type designed particularly for use in connection with motor vehicles having only two doors and wherein it is necessary that the seats be moved to permit the entrance and exit of passengers. In the present assembly a single seat is provided at the front of the vehicle and adjacent the doors of sufficient width to accommodate two passengers and at the same time of such width that sufficient space is allowed between the extremities of the seat and the adjacent walls of the vehicle to enable a swinging movement of the seat when desired.

The structure which permits the swinging movement of the seat includes at one end, a supporting bearing upon which the seat is carried and which acts as a pivot, and mechanism for swinging the seat on the pivot. A trackway is provided at the other end of the seat and brackets fixed to the seat extend downwardly and engage the trackway and travel therein when the seat is moved. Normally the brackets form the supporting means for this end of the seat. Suitable spring means are provided for retaining the seat in its normal position.

Other objects and features will more clearly hereinafter appear by reference to the accompanying drawing and specification, wherein like characters of reference designate corresponding parts throughout the several views, in which:

Fig. 1 is a top plan view;
Fig. 2 is a side elevation;
Fig. 3 is a rear view in elevation;
Fig. 4 shows in detail the track and bracket structure; and
Fig. 5 illustrates a modified form of operating mechanism.

In Fig. 1 the illustration comprehends a conventional motor car assembly and includes the body 1, the rear seat 2, the doors 3 and 4, the front seat 5, and the floor 6. The swivel structure includes the hollow standard 7 fixed to the floor of the car at one side of the vehicle in a position to engage the bearing plate 8 secured to the undersurface of the seat 5. A pin 9 extends through the bearing plate 8 and the standard 7, and is keyed to the former. A spring 10 is positioned on the pin and tends to retain the bearing surfaces in engaging position.

Any suitable mechanism may be used for rotating the pin 9 and with it the bearing plate 8 and the seat 5. In the main disclosure suitable lever mechanism is provided and includes the crank arm 11, the connecting rod 12, and the operating lever 13. The conventional ratchet 14 co-acts with the pin 15 to retain the operating lever 13 in the desired position. In lieu of the crank mechanism described above, the seat may be caused to swing by means of a rack and segment such as illustrated in Fig. 5. In this figure the segment 16 would be fixed to the pin 9 and the rack 17 would be connected to the operating lever 13 by suitable linkage.

For supporting the other end of the seat 5 while in normal position and also during its swinging movement, means are provided including a trackway 18. This trackway comprises a base suitably perforated at 19 to receive the securing means, side walls 20, and inwardly extending flanges 21. A bracket 22 is secured to the underside of the seat and is of arcuate shape to correspond to the shape of the trackway 18. The bracket includes two downwardly extending shanks 23 enlarged at their ends to form shoes 24 which engage beneath the flanges 21 and rest upon the trackway.

For retaining the seat in its normal position a spring 25 is provided, one end of which is secured to the bracket 26, and the other end of which, through the medium of the cable 27, is secured to the rear shank 23. The spring is positioned below the floor board 6 and the cable is extended upwardly through the floor board and over the pulleys 28 at a point adjacent the rear of the seat. This arrangement is provided to avoid the accumulation of parts in such a position as to interfere with the passengers.

When the present structure is assembled it will be obvious that the driver of the vehicle can conveniently actuate the levers 13 to cause the free end of the seat to swing forwardly permitting free movement of the passengers through the door 3 to the rear seat 2.

The driver being seated directly over the pivot point will not interfere in any way with the movement of the seat. The present structure is capable of changes in connection with numerous details, including the specific mode of operation and the detailed structure of the track.

The provision of the spring on the pin 9 eliminates any possible vibration or unnecessary vertical movement of the parts and the spring 25 not only tends to normally return the seat, but also functions to hold the latter in a fixed position.

What I claim is:

1. A vehicle seat mounting including a hollow standard having an upper bearing surface, a bearing plate fixed to the bottom of the seat and engaging the upper bearing surface of the standard, a pin keyed to the bearing plate and extending through the standard, means for rotating said pin, an arcuate track, a bracket secured to the seat and having enlarged extremities engaging said track, and spring means for holding said seat in its normal position.

2. A vehicle seat mounting including a hollow vertical standard having an upper annular bearing surface, a bearing plate fixed to the bottom of the seat and engaging the upper bearing surface of the standard, a pin keyed to the bearing plate and extending axially through the standard, means for rotating said pin, an arcuate track having side walls and inwardly extending flanges, a bracket secured to the seat and having enlarged extremities engaging said track beneath the flanges, and spring means for holding said seat in normal position.

In testimony whereof I affix my signature.

CLARK L. ROBERTS.